United States Patent [19]

Engel

[11] 4,402,218
[45] Sep. 6, 1983

[54] METHOD AND APPARATUS FOR SIDEWALL BULGE AND VALLEY DETECTION

[75] Inventor: Jean Engel, Bissen, Luxembourg

[73] Assignee: The Goodyear Tire & Rubber Company, Akron, Ohio

[21] Appl. No.: 270,087

[22] Filed: Jun. 3, 1981

[51] Int. Cl.³ .............................................. G01B 5/28
[52] U.S. Cl. .................................. 73/146; 33/174 P; 73/104
[58] Field of Search ..................... 73/146, 104, 105; 33/174 P, 174 PA, 174 Q

[56] References Cited

U.S. PATENT DOCUMENTS

| | | | |
|---|---|---|---|
| 2,251,803 | 8/1941 | Pummill | 73/146 |
| 3,303,571 | 2/1967 | Veals | 73/146 |
| 3,815,407 | 6/1974 | Lavery | 73/146 |
| 3,895,518 | 7/1975 | Leblond | 73/146 |
| 4,258,567 | 3/1981 | Fisher | 73/146 |

FOREIGN PATENT DOCUMENTS 2916882 11/1980 Fed. Rep. of Germany ........ 73/146

*Primary Examiner*—Donald O. Woodiel
*Attorney, Agent, or Firm*—T. P. Lewandowski

[57] ABSTRACT

A method and apparatus (10) for determining the presence of bulges and valleys in the sidewall of a tire (12). Displacement transducers (16–20) monitor deflections in the sidewalls of the tire (12) and provide output signals characteristic of such deflections. A differentiator (38) determines the slope of such deflections and, for such periods that the output of the differentiator (38) exceeds particular thresholds (40a,40b), integrators (42a,42b) integrate the output. The maximum integrated values sensed about the tire (12) are stored (44a,44b) and displayed (46a,46b).

22 Claims, 4 Drawing Figures

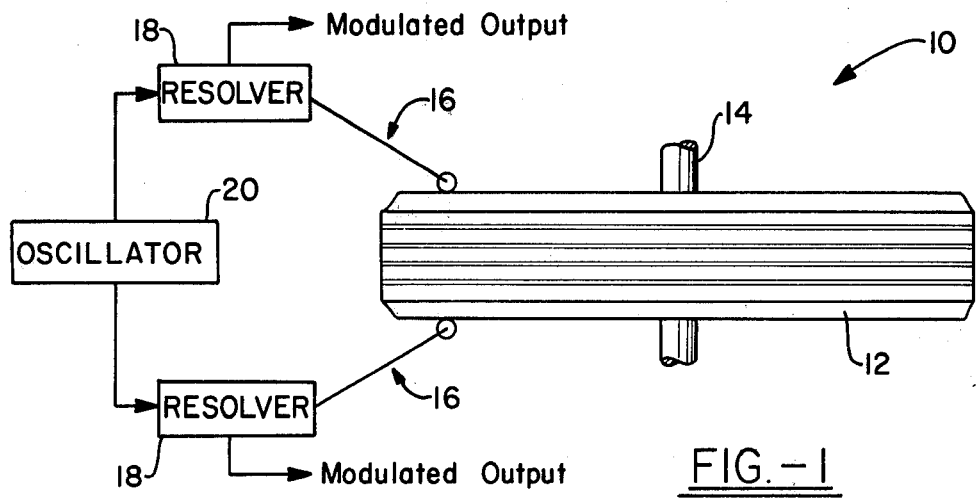
FIG.–1
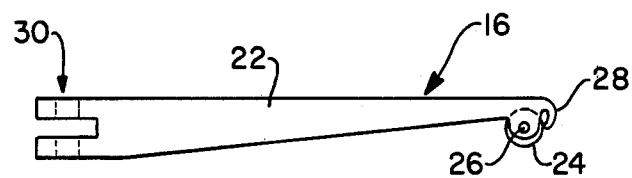
FIG.–2
FIG.–3
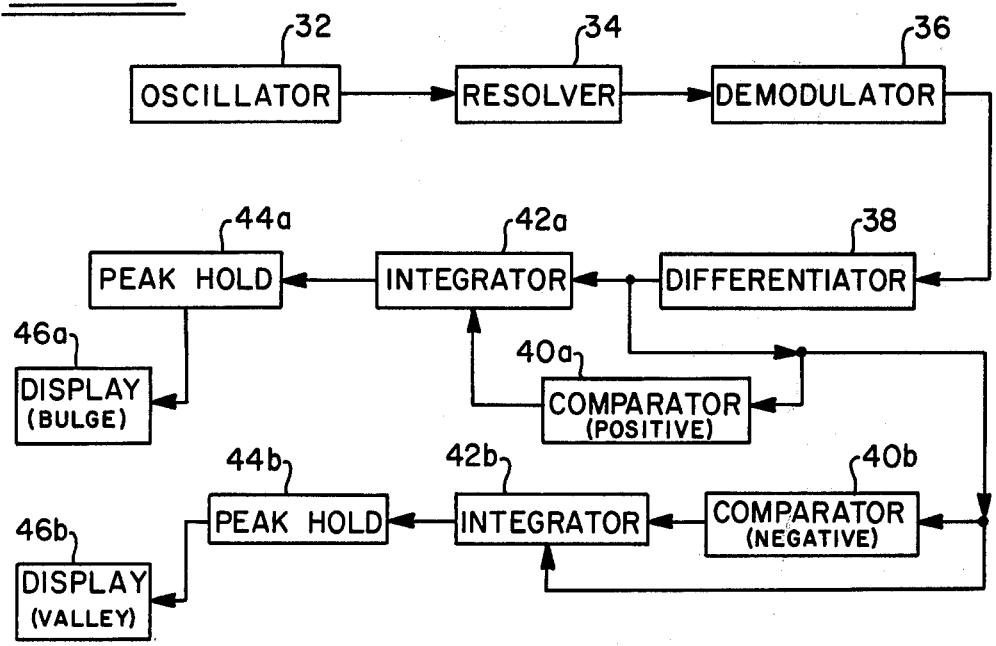

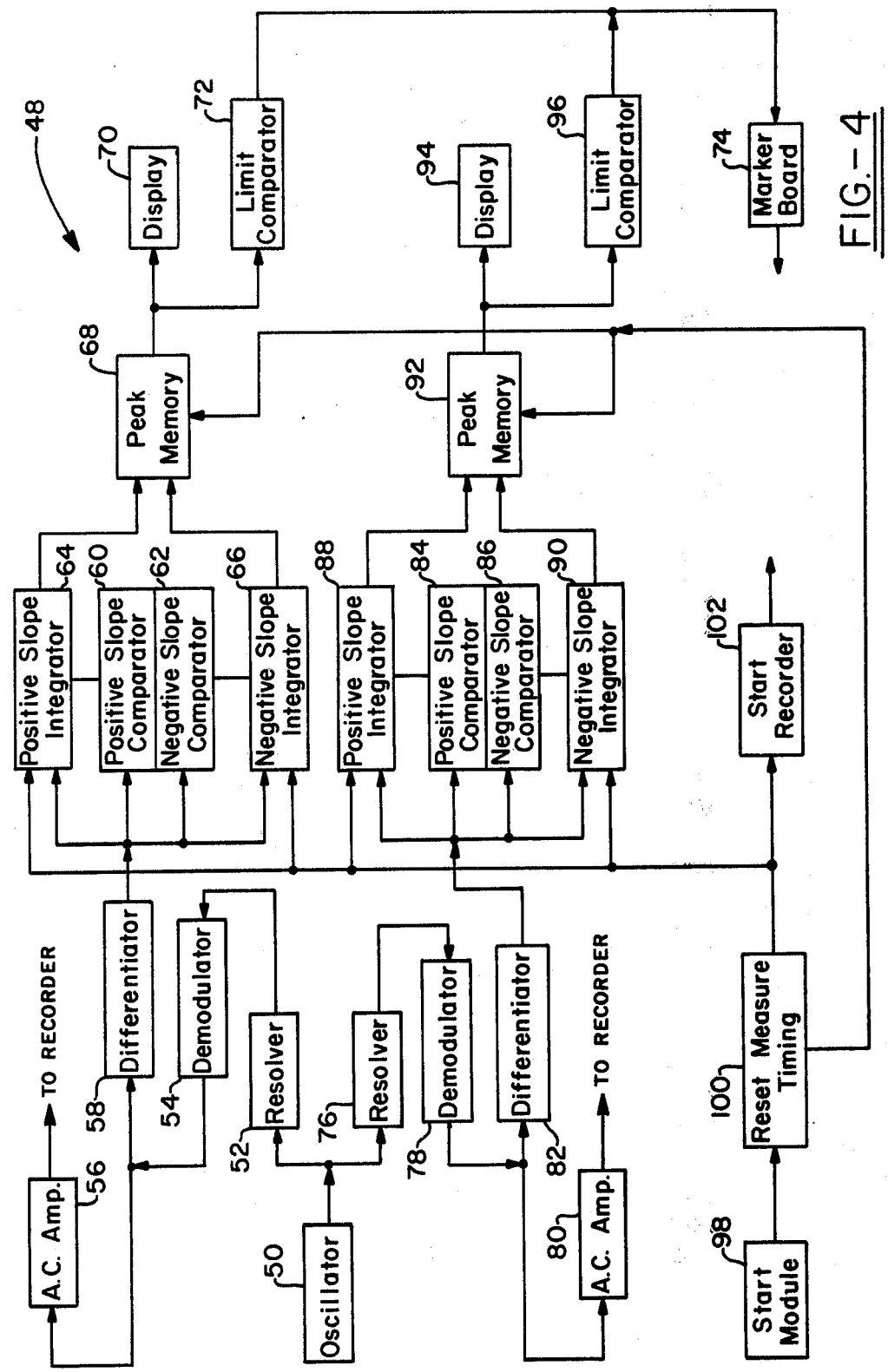

METHOD AND APPARATUS FOR SIDEWALL BULGE AND VALLEY DETECTION

TECHNICAL FIELD

The invention herein resides in the art of methods and apparatus for testing tires. More particularly, the invention presents a method and apparatus for determining the existence of bulges and valleys in the sidewalls of a tire and using such determination as a basis for the acceptability of the tire. Typically, such bulges and valleys are a result of irregularities in ply splices.

BACKGROUND ART

Heretofore, numerous test methods and apparatus have been known in the art for determining the acceptability of a tire. Force variation machines have been used to determine both lateral and radial run-out as well as tire concentricity and conicity. All of these tests have proved effective for achieving tires of improved quality for the marketplace.

It is well known that the automotive industry is presently directing its efforts to the manufacture and sale of economy cars. Such cars are substantially smaller in both size and weight than the automobiles previously supplied by the industry. These smaller vehicles are attractive due to their lesser initial cost, lighter weight, and reduced fuel consumption. This attraction has been enhanced by the usage of single-ply tires on such automobiles, such tires being of lesser cost and weight than the multiple-ply tires previously used.

While single-ply tires have become attractive for use on economy cars, certain problems inherent with those tires have become apparent. A particular problem evolves from irregularities in the ply splice at the sidewall of the tire. If this splice is other than a flush butt fit, the sidewall at the splice may exhibit undesired characteristics. For example, if the splice is lapped, the sidewall becomes exceptionally strong at that point, being effectively a double-ply at the splice. When inflated, the sidewall at the splice may not expand to the same degree as the sidewall as a whole, thus generating what is termed a "valley" in the sidewall. While this valley is an indication of exceptional strength at that point of the sidewall, if the valley is excessive it becomes unsightly and therefore unmarketable. In the case of an open splice, the sidewall is weakened such that, when inflated, the weakened area at the splice will excessively expand to define a bulge. Such a bulge is not only an indication of a weakened area in the sidewall, but becomes unsightly if excessive.

It will be appreciated that bulges and valleys are peculiar to single or mono-ply tires, since tires of multiple plies are typically of sufficient strength to be uneffected by an open or lapped splice in any of the plies. In a single ply tire an open splice results in zero ply strength at the effected area of the sidewall, while a lapped splice results in an effective doubling of the strength at that area.

While there have been several teachings in the art of apparatus for sensing and testing the dimensional characteristics of a tire, none teach the sensing and testing of bulges and valleys. Applicant is aware of U.S. Pat. Nos. 3,895,518; 3,303,571; and 2,251,803, all of which teach a technique for monitoring the sidewall of a tire. However, each of these patents is of a rudimentary mechanical nature, capable of sensing only that the sidewall of a mounted tire has exceeded the limit unassociated with the tire itself. In one such patent, a plurality of probes are positioned in a circular fashion, and a tire is placed in proximity thereto. The tire is caused to rotate and, if any of the probes are contacted, a limit switch of sorts is closed to indicate this maximum sidewall deflection. In another of the prior art teachings, an apparatus consisting of a piston and bellows is interconnected with a meter. A plurality of such devices are again spaced about the sidewall of the tire and the tire is caused to rotate. If any of the pistons are contacted by a deflection in the sidewall, the piston actuates the bellows and the amount of deflection is accordingly registered on the accompanying meter. The operator may then determine whether the deflection exceeded an allowed level.

None of the prior art teachings actually sense a deflection in the sidewall itself with respect to the sidewall as a whole. None of these prior art teachings actually sense the rate of change or the slope of the sidewall deflection. Accordingly, none of the prior art systems can truly sense the presence or absence of bulges or valleys in sidewalls, but can only sense whether or not a portion of the sidewall has exceeded some preset lateral limit.

DISCLOSURE OF INVENTION

In light of the foregoing, it is an object of a first aspect of the invention to provide a method and apparatus for determining the presence of bulges in the sidewalls of a tire.

Another object of an aspect of the invention is to provide a method and apparatus for determining the presence of valleys in the sidewalls of a tire.

Still a further object of an aspect of the invention is to provide a method and apparatus for determining the presence of bulges and valleys in the sidewall of a tire which exceed predetermined limits.

Another object of an aspect of the invention is to provide a method and apparatus for determining the presence of bulges and valleys in the sidewalls of a tire with such bulges and valleys being defined with respect to the sidewall as a whole.

Still another object of an aspect of the invention is to provide a method and apparatus for determining the presence of bulges and valleys in the sidewalls of a tire which can be readily adapted for implementation with presently existing force variation machines.

Yet a further object of an aspect of the invention is to provide a method and apparatus for detecting valleys and bulges in the sidewalls of a tire which are simplistic in concept, yet reliable and durable in operation.

Certain of the foregoing and other objects of aspects of the invention which will become apparent as the detailed description proceeds are achieved by apparatus for determining the presence of valleys and bulges in the sidewalls of a tire, comprising: first means for receiving, inflating, and rotating the tire; second means positioned opposite the tire for monitoring surface deflections of the sidewalls of the tire during rotation and presenting output signals correspondiang to said deflections; and third means connected to and receiving said output signals from said second means for determining against preselected criteria the existence of a valley or bulge within a sidewall of the tire as a function of said output signals.

Yet other objects of aspects of the invention which will become apparent as the detailed description proceeds are achieved by a method for detecting the presence of valleys and bulges in the sidewalls of tires, comprising the steps of: generating a signal corresponding to positive and negative deflections of a sidewall of a tire; differentiating said signal; comparing said differentiated signal to a predetermined threshold level; and integrating said differentiated signal during such periods as said differentiated signal exceeds said threshold level.

BRIEF DESCRIPTION OF DRAWINGS

For a complete understanding of the objects techniques, and structure of the invention, reference should be had to the following detailed description and accompanying drawings wherein:

FIG. 1 is an illustrative view of the system of the invention;

FIG. 2 is a side elevational view of the tracking probe assembly of the invention;

FIG. 3 is a block diagram of the deflection sensing circuitry of the invention; and FIG. 4 is a detailed block diagram schematic of the circuitry of the invention.

BEST MODE FOR CARRYING OUT THE INVENTION

Referring now to the drawings and more particularly FIG. 1, it can be seen that a tire mounted in a standard force variation (FV) machine is designated generally by the numeral 10. In standard fashion, the tire 12 is automatically positioned upon a hub, inflated by appropriate inflation means, and caused to rotate about a spindle 14. Tracking probes 16, to be discussed hereinafter, are brought into contacting engagement with opposite sidewalls of the tire 12 and track the sidewall during rotation. The probes 16 feed to respective resolvers 18 which are energized or excited by an oscillator 20. The probes 16 track the sidewalls about a circumference which is unobstructed by lettering or other molded depressions or protrusions such that perturbations by the probes 16 are characteristic of deflecitons of the sidewall itself.

The probe and resolver assembly 16,18 are state-of-the-art elements, the probes 16 being connected to a single-phase rotor in the resolver 18. This rotor is excited with a carrier frequency from the oscillator 20. Movement of the probes 16 accordingly effects movement of the rotor which then excites, by inductive coupling, the stator of the resolver. The output of the resolver 18 is thus a modulated output in which a signal characteristic of perturbations in the sidewall sensed by the probes 16 is carried by an AC signal of the frequency of the output of the oscillator 20. Indeed, it will be appreciated by those skilled in the art that movement of the probe 16 along the sidewall of the tire induces an output signal in much the same manner as the needle of a phonographic cartridge tracking in a record groove. Information respecting deflections in the sidewall is provided by means of the data signal superimposed on the carrier signal output of the oscillator 20. Of course, the probe and resolver assembly 16,18 could comprise a displacement transducer of the non-contact type, utilizing optical, capacitive, or similar measurement or sensing techniques.

With reference now to FIG. 2, it can be seen that the probe 16 comprises an arm 22 having a wheel or other suitable bearing 24 rotatably maintained upon an axle or pin 26. As a feature of the invention, the arm 22 includes a scraper hook 28 at the end thereof in tight closure tolerance with the wheel 24. The scraper 28 keeps the wheel 24 clean from rubber, debris, or the like, such that deflections sensed by the transducer or resolver 18 are those of the sidewall and not debris on the wheel 24. With further reference to FIG. 2, it should be noted that the end of the arm 22 is characterized by a collar 30 adapted for connection to rotor windings of the resolver 18. It will thus be appreciated that movement of the wheel 40 will accordingly effect movement of the arm 22 with resultant movement of the rotor windings of the resolver 18 being experienced.

As illustrated in FIG. 1, a feature of the invention is the simultaneous tracking of both sidewalls of the tire. It will, of course, be understood that one might desire to track only a single sidewall of the tire, and it is presented that such an embodiment is within the scope of applicant's invention. It will further be understood that much of the circuitry required for tracking both sides simultaneously is a mere result of duplication of the circuitry required for a single sidewall. Accordingly, FIG. 3 presents the basic block diagram of the bulge and valley detection circuitry of the invention for association with a single probe 16. As illustrated, an oscillator 32 excites the rotor of the resolver 34 with the stator thereof being moved via the probe 16 according to the nature of the deflecttions and perturbations in the sidewall. The resultant modulated output signal is passed to a demodulator 36 where it is demodulated and preferably filtered in a four pole butterworth filter having a corner frequency of approximately 80 hz. Of course, the filtering may be varied according to the response of the resolver 34 and the rotational speed of the tire under test, it being found with certain probes 16 that a flat response can be obtained up to 80 hz. with a contact pressure on the order of 200 grams and a rotational speed of 1 hz. In the preferred embodiment of the invention, the natural frequency of the probe and the frequency response of the filter are at least 80 times the rotatitonal frequency of the tire.

The demodulated output, being a DC signal corresponding to positive and negative deflections in the sidewall, is sent to a differentiator 38. Here the first derivative of the demodulated signal is obtained, this signal being indicative of the rate of change of the resolver signal and, accordingly, of the probe itself. In other words, the differentiator 38 presents an output corresponding to the rate of change of deflections in the sidewall as sensed by the wheel 24. Of course, the differentiator 38 is responsive to both positive and negative deflections and rates of change.

The output of the differentiator 38 is passed to comparators 40a and 40b which respectively have associated therewith a first threshold for positive deflections and a second threshold for negative delections. The first threshold is used to define a bulge, while the latter defines a valley. In other words, if the rate of change of the demodulated output of the demodulator 36 exceeds a first positive level, the comparator 40a determines that a bulge is present. In this case, the wheel 24 has moved outwardly from the sidewall of the tire 12 at an excessive rate. Similarly, if the derivative of the demodulated signal is less than a second negative threshold level, the comparator 40b determines that a valley is present. In such instance, the wheel 24 has moved inwardly of the sidewall of the tire 12 at an excessive rate. In either case, an associated integrator 42a,42b is enabled. The integrators receive the output of the differentiator 38 and integrate that signal for such period of time as the associated comparator 40a,40b indicates that the rate of change of the output of the demodulator 36 exceeds a preset level. That is, so long as the output of the differentiator 38 exceeds the first threshold, the integrator 42a is enabled or so long as the output is less than the second threshold, integrator 42b is enabled. When the output of the differentiator 38 fails to meet either threshold criteria, integration terminates and does not start anew until one of the thresholds is again satisfied.

The output of the integrators 42a,42b are passed to the corresponding peak hold circuits 44a, 44b which maintain therein the maximum output of the associated integrator 42a,42b experienced on rotation of the tire. The output of the peak holds 44a,44b are displayed for operator use on appropriate meters or displays 46a,46b. As can be seen, the integrators 42a,42b are operative to separately integrate outputs of the differentiator 38 corresponding to bulges and valleys. Similarly, the peak hold circuits 44a,44b respectively accommodate storage for both bulges and vallleys. Finally, the displays 46a,46b are operative for displaying the maximum for both bulges and valleys.

With reference now to FIG. 4, it can be seen that the circuitry of the dual probe system of the invention is designated generally by the numeral 48. As discussed above, the circuitry of the invention comprises substantial duplication to effectively generate two channels, one for each sidewall of the tire. Discussion hereafter will first be with respect to a single channel. As illustrated, an oscillator 50 excites the rotor of a resolver 52 having a contacting probe 16 extending therefrom. The resolver produces an output signal comprising a data signal superimposed on a carrier, the data signal corresponding to the track of the sidewall traced by the probe 16. This signal is demodulated and filtered as at 54 with the resultant data signal being provided to the differentiator 58. It should also be noted that this signal is applied to an AC amplifier 56 which may be supplied to a recorder (not shown) if a print of the sidewall deflection characteristics is desired.

The differentiator 58 functions to determine the instantaneous slope of the data signal output of the demodulator 54. This slope, or time rate of change, is supplied to positive and negative slope comparators 60,62. As discussed above, the positive slope comparator 60 has a threshold associated therewith for determining the presence of a bulge while the negative slope comparator 62 has a second threshold associated therewith for determining the presence of a valley. The comparators 60,62 emit outputs only when the associated reference is exceeded, in which case respective integrators 64,66 are enabled.

When the positive slope comparator 60 determines the presence of a bulge, the positive slope integrator 64 is enabled for such period of time as the bulge continues. The output of the integrator 64 is thus an indication of the magnitude of such bulge. Similarly, the negative slope comparator 62 enables the negative slope integrator 66 for such period of time that a valley is being sensed, the output of the integrator 66 being an indication of the magnitude of such valley. The outputs of the integrator 66 are passed to a peak memory 68 which, at the end of a revolution of the tire 12 contains therein data corresponding to the amplitude of the maximum bulge or maximum valley sensed for that sidewall. This data can be displayed via an appropriate meter or digital read-out display 70 and is also passed to a limit comparator 72. This comparator 72 has associated therewith a threshold. Should the value of the bulge or valley maintained in the peak memory 68 exceed the threshold of the comparator 72, an appropriate output signal is emitted. If either the maximum bulge or maximum valley on the sidewall exceeds the limit set by the comparator 72, a signal is emitted to a marker board 74 and the tire is marked accordingly for rejection. Such marking is, of course, standard in the art.

It will be appreciated that circuitry 76-96, corresponding to the elements 52-72, is provided for the second channel of the circuit 48. The elements 52-72 are associated with a first probe or channel 16, monitoring one sidewall of the tire, while the elements 76-96 are associated with the othe probe and sidewall. It should be noted that the outputs of the limit comparators 72,96 are wire-ORed together such that an output from either will effect a rejection marking of the tire.

Those skilled in the art will appreciate the similarities and differences betweenw the embodiments of FIGS. 3 and 4. In the former, peak holds 44a and 44b were uniquely associated with bulges and valleys. In the latter, a single peak memory 68 is used for both bulges and valleys, the highest in absolute value being stored. Further, the thresholds of the limit comparators 72,96 may be adjustable or selectable to accommodate a plurality of gradings.

With continued reference to FIG. 4, it should be noted that a start module 98 is provided for initializing the system, such occurring upon chucking, inflating, and rotating of the tire 12 up to a desired speed. At this instant, the start module 98 emits a signal to the reset module 100 which resets and clears the peak memories 98,92 and discharges or initializes the integrators 64,66,88,90. Similarly, the recorders are initialized as by generation of a start signal as at 102. It should further be apparent that plural rotations of the tire 12 may be effectuated with a start signal being emitted at each rotation. In other words, at the beginning of each rotation of the tire 12, the memories and integrators are cleared and initialized and the recorders are enabled to trace the tire deflections anew.

Thus it can be seen that the objects of the invention have been satisfied by the techniques and structure presented hereinabove. While in accordance with the patent statutes only the best mode and preferred embodiments of the invention has been presented and described in detail, it is to be understood that the invention is not limited thereto or thereby. Accordingly, for an appreciation of the true scope and breadth of the invention, reference should be had to the following claims.

What is claimed is:

1. Apparatus for determining the presence of valleys and bulges in the sidewalls of a tire, comprising:
   first means for receiving, inflating, and rotating a tire;
   second means positioned opposite the tire for monitoring surface deflections of the sidewalls of the tires during rotation and presenting output signals corresponding to said deflections, said second means comprising a displacement transducer including a probe interconnected with a resolver, movement of said probe generating a corresponding output from said resolver, said probe including a roller bearing at an end of an arm and further including a scaper maintained in close juxtaposition to said roller bearing; and
   third means connected to and receiving said output signals from said second means for determining against preselected criteria the existence of a valley or a bulge within a sidewall of the tire as a function of said output signals.

2. The apparatus according to claim 1 wherein said second means further includes a demodulator connected to and receiving said outputs from said resolver, demodulating said outputs, and generating said output signals corresponding to said deflections.

3. Apparatus for determining the presence of valleys and bulges in the sidewalls of a tire, comprising:
   first means for receiving, inflating and rotating a tire;
   second means positioned opposite the tire for monitoring surface deflections of the sidewalls of the tires during rotation and presenting output signals corresponding to said deflections; and
   third means connected to and receiving said output signals from said second means for determining against preselected criteria the existence of a valley or a bulge within a sidewall of the tire as a function of said output signals, said third means comprising a differentiator, receiving and differentiating said output signals, and
   an integrator connected to and integrating an output from said differentiator.

4. The apparatus according to claim 3 wherein said third means further comprises a comparator interconnecting said differentiator and integrator, said comparator enabling said integrator at such times as said output from said differentiator exceeds a preselected threshold, said integrator providing an integrated output during such times.

5. The apparatus accordiang to claim 4 which further includes memory means interconnected between said first means and said integrator for receiving and storing from said integrator the value of the maximum integrated output attained during a single rotation of the tire.

6. The apparatus according to claim 5 which further includes a limit comparator connected to said memory means, said limit comparator receiving from said memory means said value of the maximum integrated output attained during a single rotation of the tire and comparing said signal against a threshold level.

7. The apparatus according to claim 4 wherein said integrator integrates both positive-going and negative-going portions of said output of said differentiator.

8. The apparatus according to claim 7 wherein said comparator has associated therewith a first threshold for positive-going portions of said output of said differentiator and a second threshold for negative-going portions thereof.

9. The apparatus according to claim 8 wherein said memory means receives and stores the maximum value of said integrated output during a single rotation of the tire irrespective of said maximum value being associated with positive-going or negative-going portions of said output of said differentiator.

10. The apparatus according to claim 9 wherein said second means comprises a pair of probes positioned on opposite sides of the tire in contacting engagement with opposite sidewalls thereof, each said probe being interconnected with a resolver, movement of each said probe generating an output from the corresponding resolver.

11. A method for detecting the presence of valleys and bulges in the sidewalls of tires, comprising the steps of:
   generating a signal corresponding to positive and negative deflections of a sidewall of a tire;
   differentiating said signal;
   comparing said differentiated signal to a predetermined threshold level; and
   integrating said differentiated signal during such periods as said differentiated signal exceeds said threshold level.

12. The method according to claim 11 which further includes the steps of determining the maximum value obtained from integrating said differentiated signal for a said period.

13. The method according to claim 11 wherein said differentiated signal includes both positive-going and negative-going portions, and said step of comparing includes comparing said differentiated signal against both positive and negative thresholds.

14. The method according to claim 13 where said step of integrating includes integrating both positive and negative transitions of said differentiated signal over such periods as said positive and negative thresholds are respectively exceeded.

15. The method according to claim 14 which further includes the step of comparing the maximum values obtained from integrating said positive and negative transitions of said differentiated signal for respective periods against a predetermined level.

16. The method according to claim 15 wherein each of said steps are simultaneously performed for both sidewalls of the tire.

17. Apparatus for detecting the presence of valleys and bulges in the sidewalls of tires, comprising in combination:
   means for generating a signal corresponding to positive and negative deflections of a sidewall of a tire;
   means for differentiating said signal;
   means for comparing said differentiated signal to a predetermined threshold level; and
   means for integrating said differentiated signal during such periods as said differentiated signal exceeds said threshold level.

18. Apparatus according to claim 17 and further comprising means for determining the maximum value obtained from integrating said differentiated signal for said periods.

19. Apparatus according to claim 17 wherein said differentiated signal includes both positive-going and negative-going portions, and wherein said means for comparing includes means for comparing said differentiated signal against both positive and negative thresholds.

20. Apparatus according to claim 19 wherein said means for integrating includes means for integrating both positive and negative transitions of said differentiated signal over such periods as said positive and negative thresholds are respectively exceeded.

21. Apparatus according to claim 20 and further comprising means for comparing the maximum values obtained from integrating said positive and negative transitions of said differentiated signal for respective periods against a predetermined level.

22. Apparatus according to claim 21 wherein valleys and bulges are simultaneously detected for both sidewalls of the tire.

* * * * *